(12) United States Patent
Goetz et al.

(10) Patent No.: US 9,239,733 B2
(45) Date of Patent: Jan. 19, 2016

(54) BATCH JOB COMPLETION ESTIMATION USING HISTORICAL DATA

(75) Inventors: Thomas Goetz, Eckermannstrasse (DE); Suresh Babu, West Chester, PA (US)

(73) Assignee: SAP SE, Walldorf (DE)

( * ) Notice: Subject to any disclaimer, the term of this patent is extended or adjusted under 35 U.S.C. 154(b) by 476 days.

(21) Appl. No.: 13/528,710

(22) Filed: Jun. 20, 2012

(65) Prior Publication Data

US 2013/0346986 A1 Dec. 26, 2013

(51) Int. Cl.
- *G06F 9/46* (2006.01)
- *G06F 3/048* (2013.01)
- *G06F 9/48* (2006.01)
- *G06F 11/32* (2006.01)
- *G06F 11/34* (2006.01)
- *G06F 11/30* (2006.01)

(52) U.S. Cl.
CPC ............ *G06F 9/485* (2013.01); *G06F 11/3055* (2013.01); *G06F 11/324* (2013.01); *G06F 11/3419* (2013.01); *G06F 11/3003* (2013.01); *G06F 11/3466* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 6,289,368 | B1 * | 9/2001 | Dentler et al. | 718/101 |
| 7,577,632 | B2 * | 8/2009 | Thompson et al. | 706/47 |

OTHER PUBLICATIONS

Microsoft; Progress Bars, MSDN, Oct. 9, 2005.*

* cited by examiner

*Primary Examiner* — Meng An
*Assistant Examiner* — Bing Zhao
(74) *Attorney, Agent, or Firm* — Mintz Levin Cohn Ferris Glovsky and Popeo, P.C.

(57) ABSTRACT

Methods and apparatus, including computer program products, are provided for scheduling batch jobs. In one aspect there is provided a method. The method may receiving, at a progress engine, status information provided by a job scheduler controlling an execution of a plurality of jobs, the status information representative of the plurality of jobs of the batch job; receiving, at the progress engine implemented on at least one processor, reference information representative of past executions of batch jobs; determining, by the progress engine, a completion time for the batch job based on the received status information and the received reference information; and generating, by the progress engine, a page including the determined completion time. Related systems, methods, and articles of manufacture are also disclosed.

16 Claims, 8 Drawing Sheets

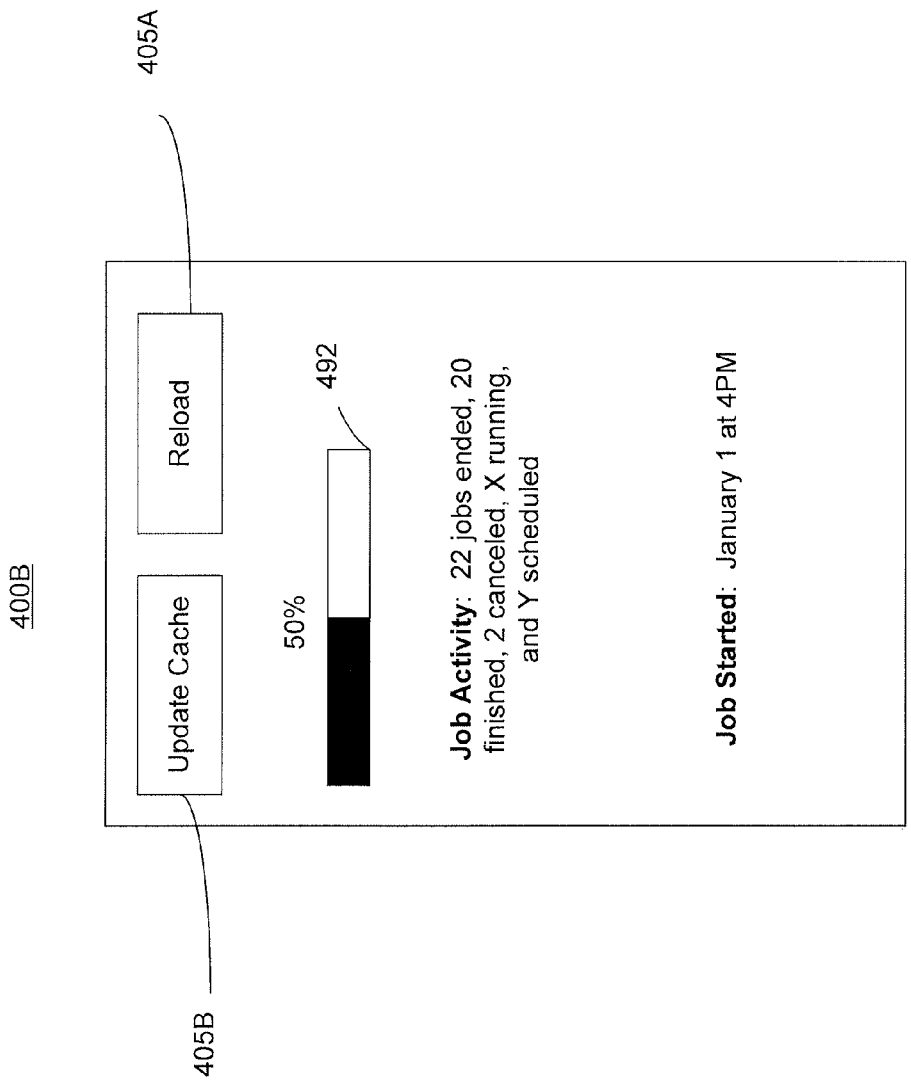

| TREEID | DESCR | S | START_TIME | END_TIME | DURATION | FORECAST |
|---|---|---|---|---|---|---|
| 1 | J5PB_TC01 | F | 20.111.205.094.501 | 20.111.205.100.142 | 1.001 | .905 |
| 1.1 | J5PB_TC01_01 | F | 20.111.205.094.501 | 20.111.205.094.911 | .250 | .225 |

BATCH JOB COMPLETION ESTIMATION USING HISTORICAL DATA

FIELD

The present disclosure generally relates to data processing and, in particular, scheduling jobs.

BACKGROUND

A batch job refers to one or more programs executed on a processor, such as a computer. Typically, the processor executes the programs, and each program performs a job, such as a task, with little, or no, intervention by a user. For example, a batch job may read transactions performed during the day, post those transactions to corresponding accounts, and then archive the posted changes to storage. Although the previous example is relatively simple, some batch jobs may include dozens of jobs, some of which execute in parallel and some of which execute serially. Moreover, a job, such as a program in the batch job, may provide an input and trigger the execution of another program. Because of such dependencies and complexities, it is difficult to gauge the progress of batch jobs.

SUMMARY

In one aspect there is provided a method. The method may include receiving, at a progress engine, status information provided by a job scheduler controlling an execution of a plurality of jobs, the status information representative of the plurality of jobs of the batch job; receiving, at the progress engine implemented on at least one processor, reference information representative of past executions of batch jobs; determining, by the progress engine, a completion time for the batch job based on the received status information and the received reference information; and generating, by the progress engine, a page including the determined completion time.

In some implementations, the above-noted aspects may further include additional features described herein including one or more of the following. The status information may include identities of the plurality of jobs of the batch job being executed and an execution status for the plurality of jobs. The progress engine may access an interface at the job scheduler to obtain the status information. The reference information may represent past executions of batch jobs includes execution times for the jobs of the batch jobs. The determining may further include adjusting the completion time based on an average completion time determined from at least the received reference information. The page may further include a graphical element representative of the determined completion time; and a textual element adjacent to the graphical element, the textual element including text representative of the determined completion time.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings,

FIGS. 4A-4C depict examples of pages depicting the progress of a batch job, in accordance with some exemplary implementations;

FIG. 4D depicts a page presenting status information for jobs, in accordance with some exemplary implementations;

Figure 1:
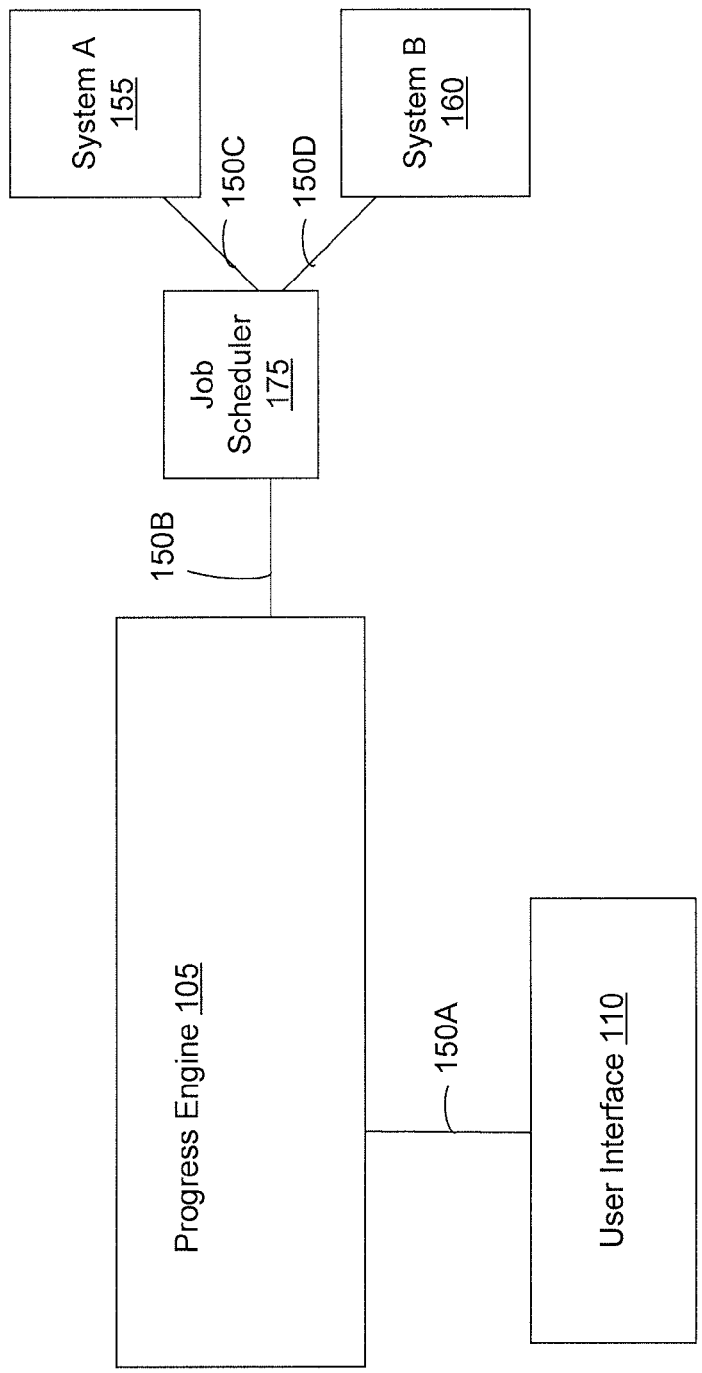
FIG. 1 depicts an example of a system, in accordance with some exemplary implementations.

Like labels are used to refer to same or similar items in the drawings.

DETAILED DESCRIPTION

FIG. 1 depicts as system 100 including a plurality of systems, such as system A 155 and system B 160, a job scheduler 175, a progress engine 105, and a user interface 110, all of which may be coupled by communications mechanisms 150A-D, such as for example a link, a network, a bus, and/or any other form of communications.

In some implementations, job scheduler 175 controls the execution of one or more jobs, such as batch jobs, at one or more processors, such as system A 155 and system B 160. The job scheduler 175 may include instructions, such as code, and the instructions may cause execution of the one or more jobs, define the structure of the jobs, and define the dependencies of the jobs. Moreover, the job scheduler 175 may include status information describing the execution of the jobs. The status information may include a start time when the jobs are initiated, a stop time when the job terminates, dependencies, parent/child relationships, log file information, and/or other aspects of the jobs.

For example, job scheduler 175 may control a batch job which is as follows: (1) job scheduler 175 may initiate a copy of sales transactions for a given day from system A 155 to system B 160, (2) when the copy job is completed, job scheduler 175 may initiate processing at system B 160 of the transactions by posting the transactions to each customer's account at system B 160, and (3) when the posting is complete, job scheduler 175 may instruct system B 160 to signal system A that the postings have been completed. During the performance of these jobs, job scheduler 175 may obtain status information regarding the jobs. Although the previous example lists three jobs performed serially, other quantities and types of jobs may be implemented as well and those jobs may be executed serially, in parallel, or a combination of both.

The jobs at systems 155 and 160 may each comprise a task or a function. For example, the job may correspond to a program (also referred to as code) stored on memory, which when executed by a processor provides the job. Moreover, the execution of a job may depend on one or more other jobs. For example, before beginning the execution of a first job, the job scheduler 175 may include instructions specifying that another job complete execution beforehand. In this example, the other job and the first job execute serially. Jobs may also execute in parallel, such that one or more of the jobs have some overlap in their execution times. Moreover, some jobs may provide an output, such as a data value or a trigger, to other jobs.

In some implementations, progress engine 105 interfaces directly with job scheduler 175, rather than systems A 155 and system B 160, to obtain status information on the jobs being controlled by job scheduler 175. Moreover, progress engine 105 may process the status information on the jobs being controlled by job scheduler 175 and compare that status information to reference information. The reference information may include historical information representative of the execution of the jobs being executed or the execution of other similar jobs. The job scheduler 175 may process the reference information to estimate the progress of the jobs currently being controlled by job scheduler 175.

To illustrate with an example, past job executions can be stored and used as an average for the execution time of a job, under the assumption that the execution times are generally similar. As this is not always the case, a correction module at the progress engine may be used to weigh past values of job execution times with a correction factor. Given a job that runs only on weekdays but not on the weekends, the correction factor for Monday to Friday may be assigned a value of 1 and for Saturday and Sunday a value of 0. In this example, the past values are multiplied with the correction factor corresponding to the time of the job run. Any results may then be added and divided by the count of correction factors, which have a value other than 0 (effectively providing an average). Next, the result may be multiplied with a weight for the planned execution to obtain a forecast of the completion of the jobs.

Job scheduler 175 may be implemented as at least one processor and at least one memory including code which when executed provides the operations described herein with respect to the job scheduler 175. The job scheduler 175 may be configured to control the execution of one or more jobs being executed at a system, such as systems 155 and 160. For example, the job scheduler 175 may initiate execution of the jobs, control the order of execution of the jobs, suspend the execution of jobs, and terminate the execution of jobs. In some implementations, the job scheduler 175 performs scheduling independently of the underlying solution.

Progress engine 105 may be implemented as at least one processor and at least one memory including code which when executed provides the operations described herein with respect to the job scheduler 175. The progress engine 105 may include an interface to job scheduler 175 in order to obtain information representative of the execution of jobs. This information may be used to determine the completion time of a current job and/or may be used later as historical information to allow estimating the completion time of the job(s).

By interfacing and then accessing job scheduler 175, progress engine 105 may determine which job is currently being executed by job scheduler 175 and then estimate a completion time based on the reference information stored and/or maintained by progress engine 105. Once the estimated completion time is calculated, progress engine 105 may generate and/or provide user interface 110 with a page (e.g., a hypertext markup language (HTML) page) or other form of output to allow assessing the progress of the jobs being controlled by the job scheduler 175, so that a user can assess forecast information as well as completion of the job(s).

The progress engine 105 may calculate the forecast of the entire job chain based on the information about the included sub-jobs by using the past execution times and the weights.

User interface 110 may be implemented as an application, such as a browser, a thin client, and the like, configured to present one or more pages (e.g., hypertext markup language pages) including scheduling information for jobs being executed by the job scheduler 175.

Figure 2:
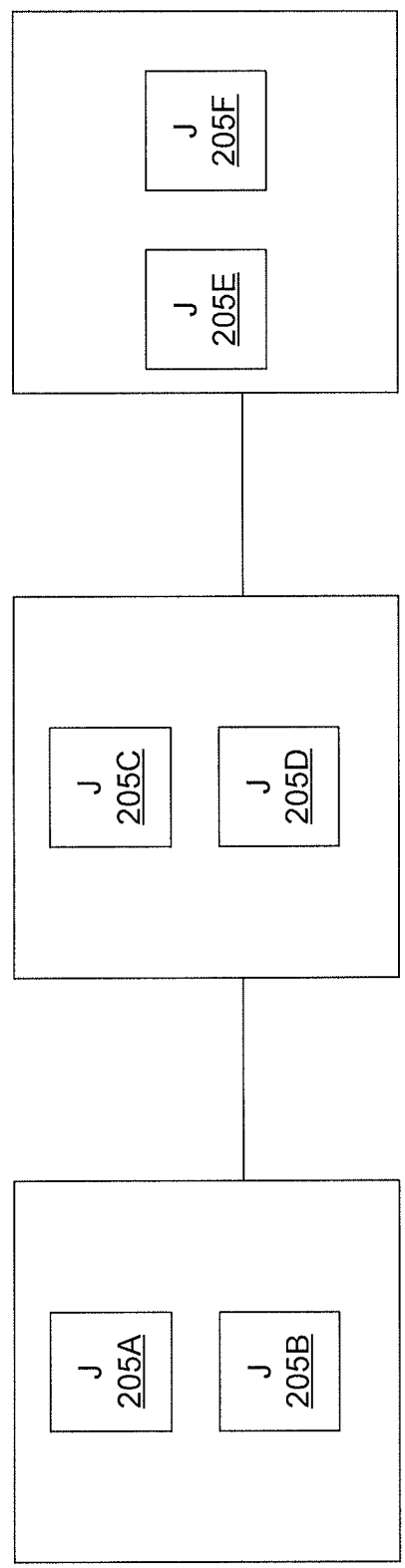
FIG. 2 depicts an example sequence of jobs.

FIG. 2 depicts an example of jobs 205A-F controlled by job scheduler 175. In the example of example FIG. 2, job 205A and job 205B may execute substantially in parallel, and, as such, job 205C and job 205D do not begin until about the completion of jobs 205A-B. Likewise, job 205C and job 205D are executed in parallel, and the execution of job 205E does not begin until about the completion of jobs 205C-D. In addition, the execution of job 205F does not begin until about the completion of jobs 205E. As job scheduler 175 controls the execution of jobs 205A-F, progress engine 105 may gather status information directly from job scheduler 175. This status information may include one or more of the following: a start time for the execution of a job; a stop time for the execution of a job; the identity of a job; and, and the like.

Figure 3:
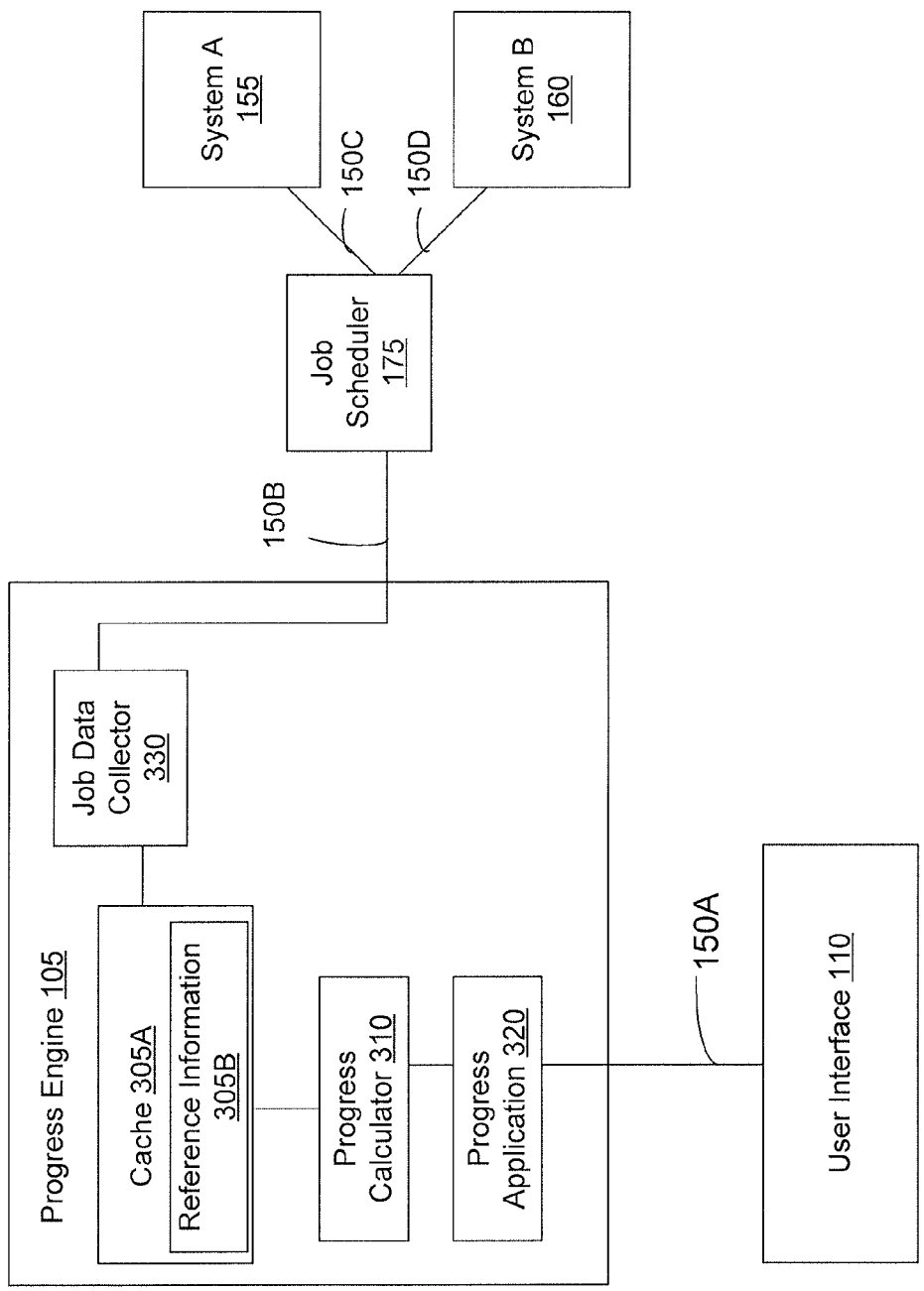
FIG. 3 depicts another example of a system, in accordance with some exemplary implementations.

FIG. 3 depicts a system 300, which is similar to system 100 in some respects but includes additional features as noted herein. For example, progress engine 105 may include a job data collector 330, a cache 305A including reference data 305B, a progress calculator 310, and a progress application 320.

In some exemplary implementations, the job data collector 330 may be implemented at a processor and a memory and may be configured to collect status information from job scheduler 175. For example, job data collector 330 may interface with the job scheduler 175 to monitor jobs executed by job scheduler 175 and obtain from job scheduler 175 status information on the execution of those jobs, which may correspond to a batch job being performed at one or more of systems A 155 and system B 160. This status information may include a start time for the execution of a job, a stop time for the execution of a job, a state of the execution of a job, an identity of a job, and the like. The job data collector 330 may then provide the status information obtained from job scheduler 175 to a storage mechanism, such as cache 305A.

Cache 305A may buffer the current status information regarding the batch job being executed by job scheduler 175. Cache 305A may also contain reference data 305B. Reference data 305B may include historical information regarding past executions of the batch job as well as status information regarding the execution of other, for example, similar jobs. This historical information may include the quality of jobs in the batch job, the type of jobs, the start and stop time for each job, and the like. The cache may also disconnect the data retrieval from progress calculation and from the user interface. The cache update may be performed asynchronously, without delays due in part to update.

Figure 4A:
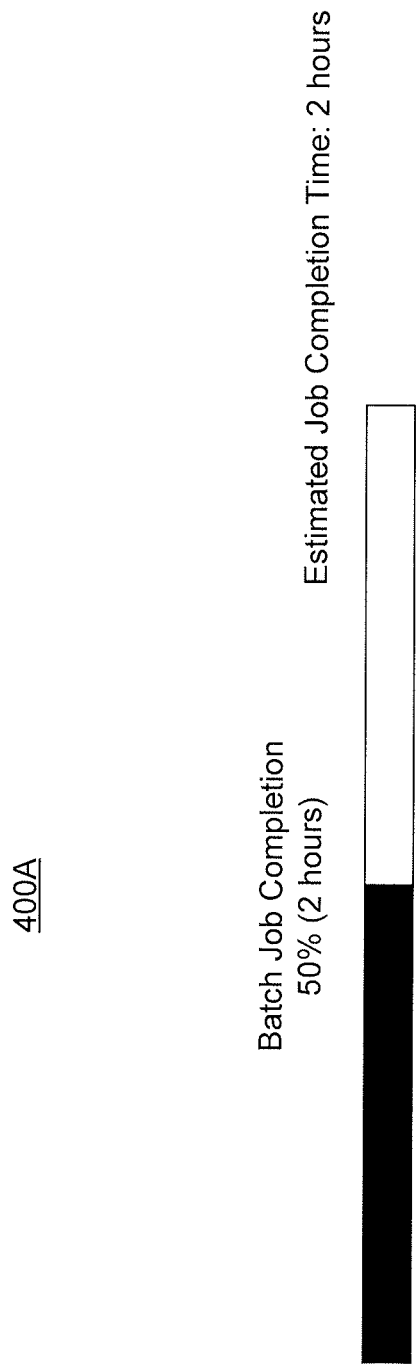
Figure 4C:
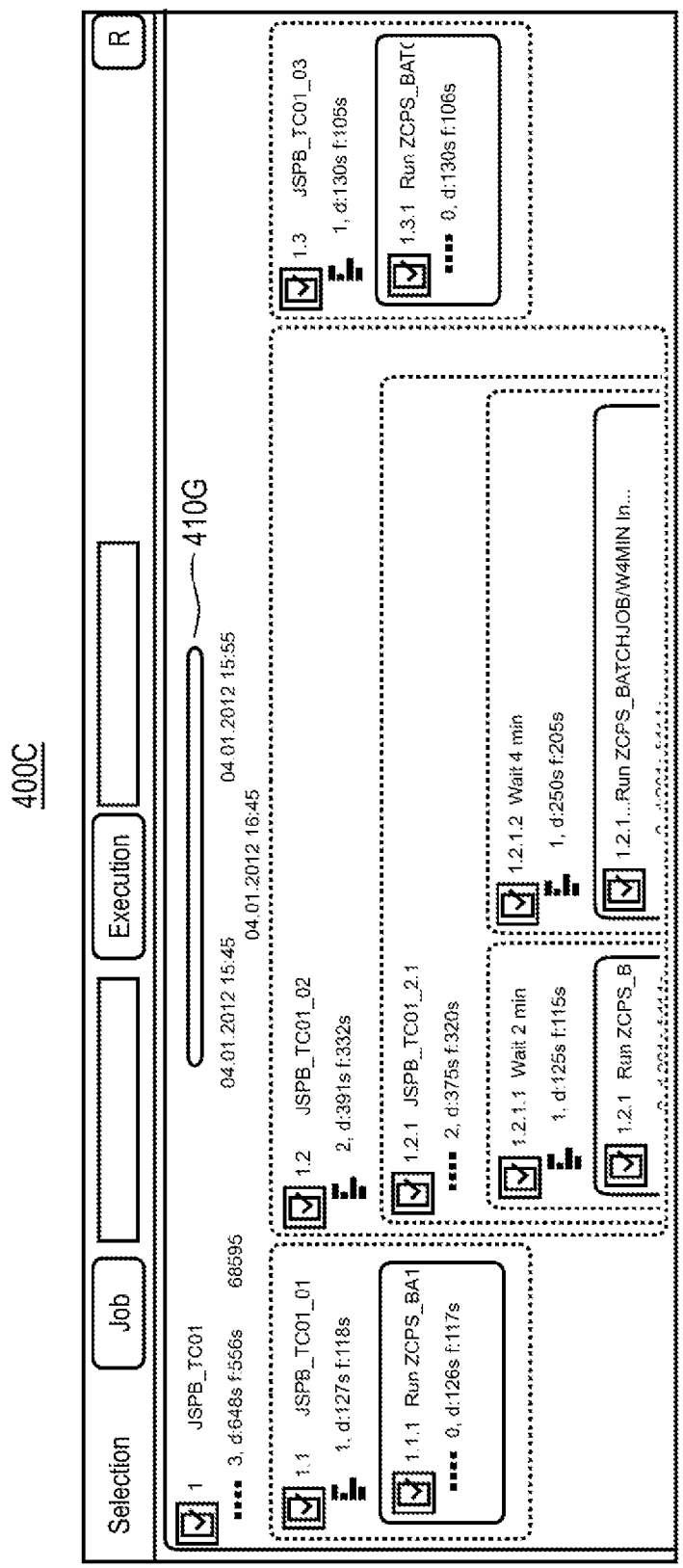

The progress calculator 310 may obtain from cache 305A the current status information regarding the batch job being executed by job scheduler 175 and process the current status information to determine the progress of execution of the batch job. For example, the progress calculator 310 may compare the current status information regarding the batch job to the reference data 305B (which includes historical information representative of past executions of the same or similar batch job). The progress calculator 310 may also generate a page representative of the progress of the execution of the batch job. FIGS. 4A-4C depict examples of pages 400A-C of such pages.

The progress application 320 may be implemented as a user interface to show the progress of the job scheduling.

FIG. 4A depicts a page 400A generated by progress engine 105 based on reference information regarding the execution of jobs at systems 155 and 160. The page 400A includes a graphical element and adjacent textual information to show that the batch job is 50% complete and will require 2 additional hours to complete. To generate page 400A, progress engine 105 may determine the current status of execution of the jobs and calculate when the batch job will be completed based on reference information 305B. The progress engine may also apply correction factors as noted above. For example, a given batch job may include 10 individual jobs and currently the $5^{th}$ job in that batch has terminated execution. The progress engine 105 may determine the status (e.g., $5^{th}$ job completed execution), and refer to reference information 305B indicating that on average the given batch job terminates in about 4 hours. As such, the progress engine 105 may determine that the execution will take 4 hours and that execution is about 50%. Next, progress engine 105 may generate page 400A based on this information. The progress engine's progress calculation may also determine if the actual execution point is behind forecasted completion. For example, if a job in the middle of task sequence is delayed, the completion time of the sequence of task will also be delayed. In this example, the progress engine may calculate the difference between the actual runtime and the resulting forecast (and the forecast without delays). From the difference, a status may be calculated (e.g., a delay of end time).

FIG. 4B depicts a page 400B generated by progress engine 105 based on reference information 305B regarding the execution of jobs at systems 155 and 160. The page 400B includes a progress bar 492 showing the batch job is 50% complete. The page 400B also shows the quantity of jobs that have ended (which have been canceled before finishing), the quantity of jobs that have finished, the quantity of jobs running, the quantity of jobs scheduled, and when the batch job started. Page 400B includes an element 405A to reload and an element 405B to update the cache.

FIG. 4C depicts another page 400C generated by progress engine 105. Page 400C depicts a batch job 410A including a first job 410B. After first job, 410B completes execution, a second set of jobs 410C executes. The second set of jobs 410C includes two jobs 410D and E that execute serially. After, the second set of jobs 410 executes, a third job 410F executes. The control of the jobs shown at FIG. 4C may be performed by job scheduler 175. However, progress engine 105 may access job scheduler 175 to access information regarding the current status of execution of the jobs, compare the current states to reference information 305B, and calculate the progress of the batch job 410. In the example of FIG. 4C, the progress is depicted by a progress bar 410G and an estimated completion time 410H. The width of the blocks shows the percentage of the execution time in relation to the execution time of the surrounding block.

FIG. 4D depicts an example of a page 400D that includes information regarding the execution of batch jobs used by progress engine 105. For example, progress engine 105 may access job scheduler 175 to obtain status information regarding the current execution of a job, such as identification information of the jobs 416A and B, the start time 416C of each job, the end time 416D of each job, the actual duration 416E, and a calculated (or forecast) duration for each job.

Figure 5:
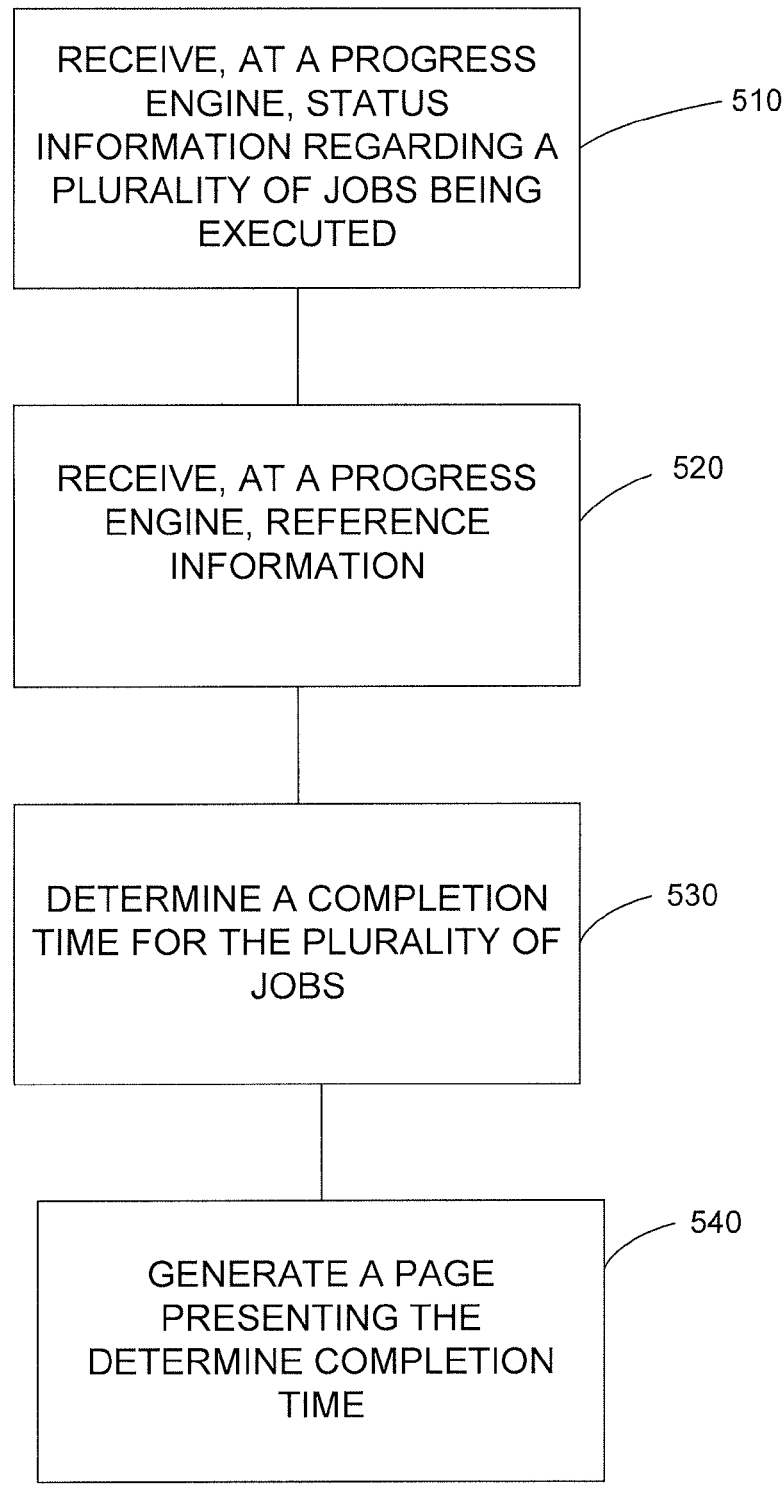
FIG. 5 depicts an example process, in accordance with some exemplary implementations.

FIG. 5 depicts a process 500 for determining the execution progress of batch jobs.

At 510, the progress engine 105 may receive status information. For example, the progress engine 105 may interface with the job scheduler 175 to access and thus obtain status information representative of the jobs being executed under the direction of the job scheduler 175. The status information may include the identity of the jobs currently in the batch being executed, the execution status including the start and, if completed, the stop time of the job execution. In some implementations, the progress engine 105 may directly access a separate job scheduler 175 via an interface, such as a programming interface, to obtain the status information.

At 520, the progress engine 105 may receive reference information. For example, progress engine 105 may receive from cache 305A reference information 305B representative of past executions of jobs that are similar to, or the same as, the jobs in the batch being controlled by job scheduler 175.

At 530, progress engine 105 may determine a completion time for the jobs based on the information received at 510 and 520. For example, the progress engine 105 may include status information that a certain batch job having 100 jobs has completed the $99^{th}$ job, and reference information 305B may indicate that the last job (i.e., the $100^{th}$ job of the batch) takes 2 hours. In this example, the progress engine 105 may estimate the completion time as about 2 hours. In some implementations, progress engine 105 may apply correction factors to adjust the completion time based on historical information, as noted above.

At 540, the progress engine 105 may generate a page presenting the completion time determined at 530. For example, progress engine 105 may generate pages, such as those depicted at FIGS. 4A-D. The generated page may be sent to a user interface for presentation to a user.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure at least one processor to perform operations comprising:
   receiving, at a progress engine coupled to a job scheduler that is separate from the progress engine, status information provided by the job scheduler controlling an execution of a plurality of jobs of a batch job, the status information describing at least one of the plurality of jobs of the batch job;
   receiving, at the progress engine implemented on at least one processor, reference information representative of at least one past batch job execution;
   determining, by the progress engine, a completion time for the batch job based on the received status information and the received reference information, the job scheduler accessing a cache to temporally decouple execution of the receiving from execution of the determining;
   determining, by the progress engine, the completion time based on the reference information, wherein the reference information includes at least one past job execution that is similar to, but not the same as, the jobs in the plurality of the batch jobs being controlled by the job scheduler; and
   generating, by the progress engine, a page for display on a user interface, the page including a graphical element representative of the determined completion time and a textual element adjacent to the graphical element, the textual element including text representative of the determined completion time.

2. The non-transitory computer-readable medium of claim 1, wherein the status information includes identities of the plurality of jobs of the batch job being executed and an execution status for the plurality of jobs.

3. The non-transitory computer-readable medium of claim 1, wherein the progress engine accesses an interface at the job scheduler to obtain the status information.

4. The non-transitory computer-readable medium of claim 1, wherein the reference information representative of the at least one past batch job execution or past executions of batch jobs includes at least one execution time.

5. The non-transitory computer-readable medium of claim 1, wherein the determining further comprises:
   adjusting the completion time based on an average completion time determined from at least the received reference information.

6. The non-transitory computer-readable medium of claim 1, wherein the reference information includes at least one past job execution that is the same as the jobs in the plurality of the batch jobs being controlled by the job scheduler.

7. A system comprising:
   at least one processor; and
   at least one memory including code, which when executed by the at least one processor provides operations comprising:
      receiving, at a progress engine coupled to a job scheduler that is separate from the progress engine, status information provided by the job scheduler controlling an execution of a plurality of jobs of a batch job, the status information describing at least one of the plurality of jobs of the batch job;
      receiving, at the progress engine implemented on at least one processor, reference information representative of past executions of batch jobs;
      determining, by the progress engine, a completion time for the batch job based on the received status information and the received reference information, the job scheduler accessing a cache that temporally decouples the execution of the receiving from the determining;
      determining, by the progress engine, the completion time based on the reference information, wherein the reference information includes at least one past job execution that is similar to, but not the same as, the jobs in the plurality of the batch jobs being controlled by the job scheduler; and
      generating, by the progress engine, a page for display on a user interface, the page including a graphical element representative of the determined completion time and a textual element adjacent to the graphical element, the textual element including text representative of the determined completion time.

8. The system of claim 7, wherein the status information includes identities of the plurality of jobs of the batch job being executed and an execution status for the plurality of jobs.

9. The system of claim 7, wherein the progress engine accesses an interface at the job scheduler to obtain the status information.

10. The system of claim 7, wherein the reference information representative of past executions of batch jobs includes execution times for the jobs of the batch jobs.

11. The system of claim 7, wherein the determining further comprises:
    adjusting the completion time based on an average completion time determined from at least the received reference information.

12. A method comprising:
    receiving, at a progress engine coupled to a job scheduler that is separate from the progress engine, status information provided by the job scheduler controlling an execution of a plurality of jobs of a batch job, the status information describing at least one of the plurality of jobs of the batch job;
    receiving, at the progress engine implemented on at least one processor, reference information representative of past executions of batch jobs;
    determining, by the progress engine, a completion time for the batch job based on the received status information and the received reference information, the job scheduler accessing a cache that temporally decouples the execution of the receiving from the determining;
    determining, by the progress engine, the completion time based on the reference information, wherein the reference information includes at least one past job execution that is similar to, but not the same as, the jobs in the plurality of the batch jobs being controlled by the job scheduler; and generating, by the progress engine, a page for display on a user interface, the page including a graphical element representative of the determined completion time and a textual element adjacent to the graphical element, the textual element including text representative of the determined completion time.

13. The method of claim 12, wherein the status information includes identities of the plurality of jobs of the batch job being executed and an execution status for the plurality of jobs.

14. The method of claim 12, wherein the progress engine accesses an interface at the job scheduler to obtain the status information.

15. The method of claim 12, wherein the reference information representative of past executions of batch jobs includes execution times for the jobs of the batch jobs.

16. The method of claim 12, wherein the determining further comprises:

adjusting the completion time based on an average completion time determined from at least the received reference information.

* * * * *